(12) United States Patent
Shuai (10) Patent No.: US 8,254,996 B2
(45) Date of Patent: Aug. 28, 2012

(54) SYSTEMS AND METHODS FOR MANAGING ACCESS CHANNELS

(75) Inventor: Zhen Zhong Frankie Shuai, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1025 days.

(21) Appl. No.: 12/195,435

(22) Filed: Aug. 21, 2008

(65) Prior Publication Data

US 2009/0117929 A1 May 7, 2009

Related U.S. Application Data

(60) Provisional application No. 60/985,306, filed on Nov. 5, 2007.

(51) Int. Cl.
*H04B 1/38* (2006.01)
*H04M 1/00* (2006.01)

(52) U.S. Cl. .................. 455/561; 455/452.1; 455/67.11; 455/67.13; 455/63.1; 455/450; 455/509; 455/512; 455/464; 370/232; 370/234; 370/329; 370/330; 370/333; 370/341; 375/225

(58) Field of Classification Search .................. 455/561, 455/450, 452.1, 452.2, 67.11, 67.13, 63.1, 455/501, 509, 512, 464; 370/332–333, 341–342, 370/234

See application file for complete search history.

(56) References Cited

U.S. PATENT DOCUMENTS

| | | | |
|---|---|---|---|
| 6,201,499 B1 * | 3/2001 | Hawkes et al. | 342/387 |
| 6,970,437 B2 * | 11/2005 | Lott et al. | 370/318 |
| 7,058,035 B2 * | 6/2006 | English | 370/332 |
| 7,069,037 B2 * | 6/2006 | Lott et al. | 455/522 |
| 7,127,274 B2 | 10/2006 | Goldberg et al. | |
| 7,176,817 B2 | 2/2007 | Jensen et al. | |
| 7,239,847 B2 * | 7/2007 | Attar et al. | 455/63.1 |
| 7,293,217 B2 * | 11/2007 | Pietraski et al. | 714/755 |
| 7,355,960 B2 * | 4/2008 | Kang et al. | 370/208 |
| 7,505,436 B2 * | 3/2009 | English | 370/332 |
| 7,515,652 B2 * | 4/2009 | Jensen | 375/308 |
| 7,570,182 B2 * | 8/2009 | Sheba et al. | 341/118 |
| 7,649,379 B2 * | 1/2010 | Seibold | 326/16 |
| 7,706,804 B2 * | 4/2010 | Huh et al. | 455/450 |
| 7,756,487 B2 * | 7/2010 | Lerner et al. | 455/76 |
| 7,773,961 B2 * | 8/2010 | Ding et al. | 455/127.2 |
| 7,782,817 B2 * | 8/2010 | Yang et al. | 370/329 |
| 7,787,415 B2 * | 8/2010 | Hunkeler et al. | 370/328 |
| 7,809,338 B2 * | 10/2010 | Tsfati | 455/76 |
| 7,864,674 B2 * | 1/2011 | Benveniste | 370/230 |
| 7,890,130 B2 * | 2/2011 | Sung et al. | 455/522 |
| 7,920,511 B2 * | 4/2011 | Khan et al. | 370/328 |
| 7,920,535 B2 * | 4/2011 | Zaks | 370/338 |
| 7,961,679 B2 * | 6/2011 | Chin et al. | 370/329 |
| 2007/0097910 A1 * | 5/2007 | Ji et al. | 370/329 |
| 2007/0105573 A1 * | 5/2007 | Gupta et al. | 455/509 |
| 2007/0105575 A1 * | 5/2007 | Sampath et al. | 455/509 |
| 2007/0105576 A1 * | 5/2007 | Gupta et al. | 455/509 |
| 2008/0108310 A1 * | 5/2008 | Tong et al. | 455/69 |

* cited by examiner

*Primary Examiner* — Marceau Milord (57) ABSTRACT

Systems and methods for maintaining base stations are provided. In this regard, a representative system, among others, includes a base station that is configured to receive transmitted signals from one or more mobile stations, calculate one or more data rates based on the transmitted signal associated with the one or more mobile stations, respectively, and generate data rate signals based on the calculated one or more data rates. The base station includes a dithering unit that is configured to apply dithering noise to the data rate signals, and memory that includes channel assignment logic configured to assign access channels to the one or more mobile stations based on the dithered signals, respectively.

20 Claims, 6 Drawing Sheets

SYSTEMS AND METHODS FOR MANAGING ACCESS CHANNELS

CROSS-REFERENCE TO RELATED APPLICATIONS

This Utility Patent Application is based on and claims the benefit of U.S. Provisional Application No. 60/985,306, filed on Nov. 5, 2007, the contents of which are hereby incorporated by reference in their entirety.

TECHNICAL FIELD

The present disclosure generally relates to network infrastructures, and more particularly, the disclosure relates to systems and methods for managing access channels associated with the network infrastructures.

BACKGROUND

Wireless local area networks (WLANs) have become increasingly popular in various scenarios, such as, in homes, offices, and public places. The first WLAN IEEE standard to become accepted in the commercial market was 802.11b, which specifies encoding techniques that provide for raw data rates up to 11 Mbps using a modulation technique called "Complementary Code Keying" (CCK). The 802.11b standard also supports a modulation technique called "Direct-Sequence Spread Spectrum" (DSSS) from the original 802.11 standard. Later another WLAN IEEE 802.11a standard appears with using a more efficient transmission method called Orthogonal Frequency Division Multiplexing (OFDM). OFDM, as implemented in 802.11a, enabled raw data rates up to 54 Mbps. Despite its higher data rates, the 802.11a standard was not as popular as the 802.11b standard because the 802.11a standard resides on an incompatible radio frequency band: 5 GHz for 802.11a versus 2.4 GHz for 802.11b. In June 2003, the IEEE ratified the 802.11g standard, which applied OFDM modulation to the 2.4-GHz band. The 802.11g standard combined the raw data rates up to 54 Mbps on the same radio frequency as the already popular 802.11b standard. A similar scenario to the draft 802.11g phenomenon is now unfolding with 802.11n. The industry came to a substantive agreement with regard to the features to be included in the high throughput 802.11n standard in early 2006.

In 802.11 WLANs, a carrier sense multiple access with collision avoidance (CSMA/CA) is used where a carrier sense multiple access with collision detection (CSMA/CD) cannot be implemented due to the nature of the channel. One reason, among others, is that wireless devices have difficulties in listening while sending data for medium access; therefore, collision detection is less likely to be achieved. In CSMA/CA, however, if the channel is determined to be busy before transmission, the transmission is deferred for a random interval. This reduces the probability of collisions on the channel.

Accordingly, the use of simple and robust CSMA/CA for medium access has contributed to the success of the 802.11 standards. However, the original CSMA/CA in 802.11 standards has some drawbacks such as high overhead, low throughput, without quality of service (QoS), etc. Although the 802.11e standard could support QoS and its media access control (MAC) also improves channel efficiency using the Block Ack technique, this mechanism is quite complex in the 802.11e standard because the 802.11e standard uses an explicit setup and tear-down procedure. Similarly, the IEEE proposed 802.11n standard draft now also can not opportunistically use high-rate hosts to improve overall channel throughput.

SUMMARY

Systems and methods for maintaining base stations are provided. In this regard, a representative system, among others, includes a base station that is configured to receive transmitted signals from one or more mobile stations, calculate one or more data rates based on the transmitted signal associated with the one or more mobile stations, respectively, and generate signals based on the calculated data rates. The base station includes a dithering unit that is configured to apply dithering noise to the data rate signals, and memory that includes channel assignment logic, which is configured to assign access channels to the one or more mobile stations based on the dithered signals, respectively.

A representative method, among others, for maintaining a base station comprises the following steps: receiving transmitted signals from one or more mobile stations; calculating one or more data rates based on the transmitted signal associated with the one or more mobile stations, respectively; generating data rate signals based on the calculated one or more data rates; applying dithering noise to the data rate signals; and assigning access channels to the one or more mobile stations based on the dithered signals, respectively.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
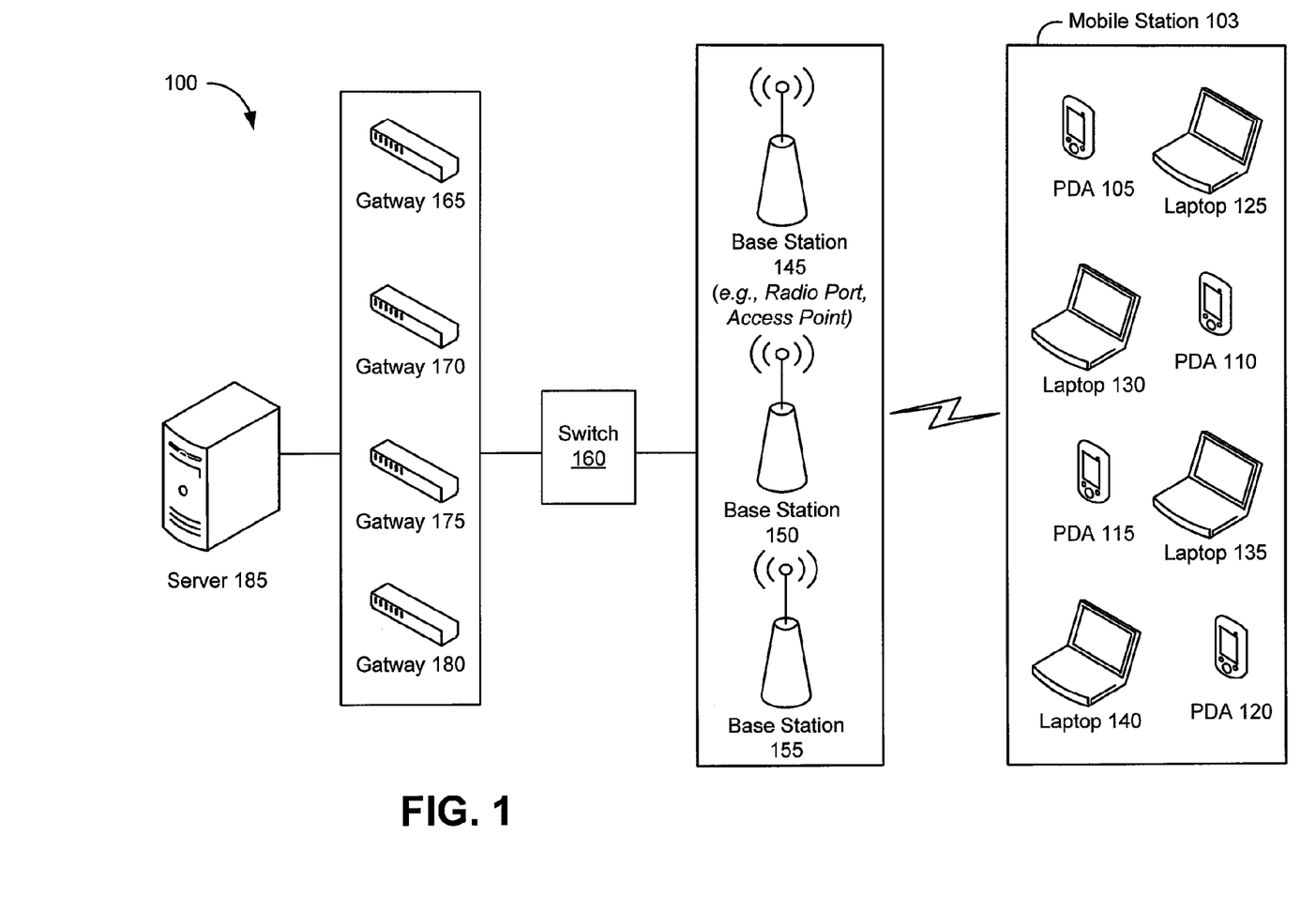
FIG. 1 is a top level block diagram that illustrates an embodiment of a network infrastructure that includes base stations configured to manage access channels.

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which access channels between base stations and mobile stations are managed in the optimum manner with the proposed dithering method in this disclosure, FIG. 1 is a block diagram that illustrates an embodiment of a network infrastructure 100 that includes one or more base stations configured to manage access channels. The network infrastructure 100 includes one or more mobile stations 103, such as, personal digital assistants (PDAs) 105, 110, 115, 120 and laptops 125, 130, 135, 140, among others. The mobile station 103 can communicate wirelessly with base stations 145, 150, 155, which include, for example, radio ports and access points, among others. The base stations 145, 150, 155 are electrically coupled to a switch 160, which in turn is electrically coupled to one or more gateways 165, 170, 175, 180. A server 185 is electrically coupled to the gateways 165, 170, 175, 180.

The base station 145, 150, 155 is configured to assign access channels to the mobile stations 103 based on the data rate of the mobile stations 103. The base station 145, 150, 155 is described further in relation to FIG. 2. Operations of the base station for managing access channels are described in relation to FIGS. 3 and 4. Although only one server 185 and one switch 160 are shown in system 100, the system 100 can include multiple servers and/or multiple switches.

Figure 2:
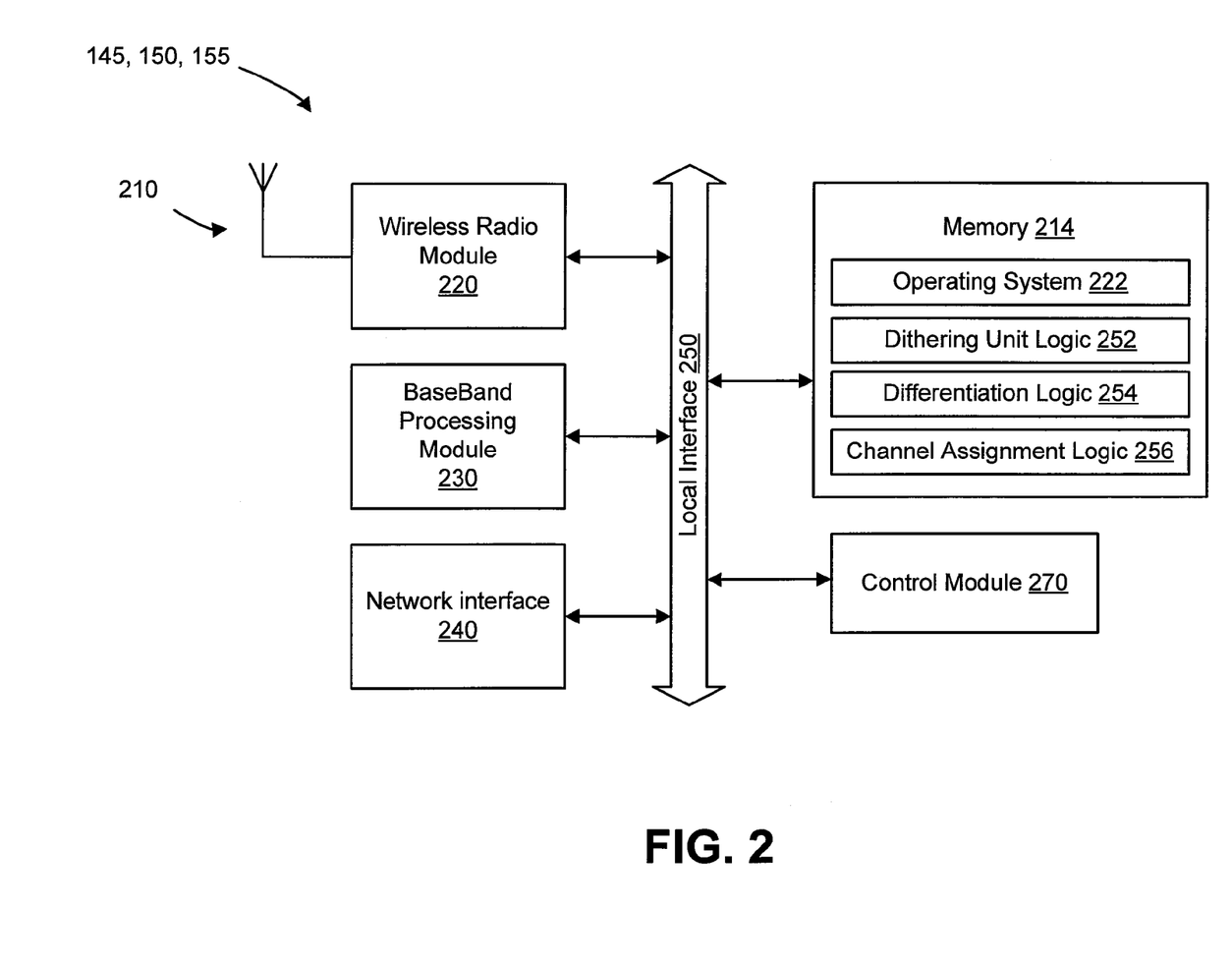
FIG. 2 is a block diagram that illustrates an embodiment of the base stations, such as that shown in FIG.1.

FIG. 2 is a block diagram that illustrates an embodiment of the base station, such as that shown in FIG.1. The base station 145, 150, 155 includes a wireless radio module 220 that is electrically coupled an antenna 210, a baseband processing module 230, a network interface 240, memory 214, and a control module 270, all of which are electrically coupled to a local interface 250 that facilitates communication among the respective devices. The local interface 250 can be, for example, but not limited to, one or more buses or other wired or wireless connections, as is known in the art. The local interface 250 may have additional elements, which are omitted for simplicity, such as controllers, buffers (caches), drivers, repeaters, and receivers, to enable communications. Further, the local interface 250 may include address, control, and/or data connections to enable appropriate communications among the aforementioned components, such as the memory bus, PCI bus, 12C bus, etc.

The wireless radio module 220 includes, but is not limited to, a receiver, transmitter, and/or transceiver, among others. It should be noted that multiple antennas 210 can be electrically coupled to the radio module 220. In fact, two antennas 210 are popular in the market now and three or four antennas 210 may be increasing in popularity due to the introduction of 802.11 n WLAN Multiple Input Multiple output (MIMO) technology. For simplicity, only one antenna 210 is drawn here. The wireless radio module 220 is configured to receive and transmit radio frequency (RF) signals, and convert the received RF signals to digital signals. The wireless radio module 220 is further configured to detect the data rate of the received RF signals from the mobile stations 103 (FIG. 1). The baseband module 230 processes the digital signals before transmitting/receiving the processed signals from/to the network infrastructure 100 through the wireless radio module 220.

The coordination between the wireless radio module 220 and the baseband module 230 is maintained by the control module 270. Such control module 270 includes a processor, which is a hardware device for executing software, particularly that stored in memory 214. The processor can be any custom made or commercially available processor, a central processing unit (CPU), an auxiliary processor among several processors associated with the base station 145, 150, 155, a semiconductor based microprocessor (in the form of a microchip or chip set), a macroprocessor, or generally any device for executing software instructions. Examples of suitable commercially available microprocessors are from several popular chipset vendors, such as Marvell, Broadcom, Atheros, etc. A widely accepted baseband/MAC processor for 802.11n radio module is, for example, Atheros newly launched AR9160 802.11n MIMO MAC/BB processor for 2.4G and 5G WLAN.

The network interface 240 enables the base station 145, 150, 155 to communicate with the switch 160 (FIG. 1) of the network infrastructure 100. The network interface 240 comprises the various components used to transmit and/or receive data over a telecommunication network (not shown), where provided. By way of example, the network interface 240 include a device that can communicate both inputs and outputs, for instance, a modulator/demodulator (e.g., modem), a radio frequency (RF) device or infrared (IR) transceiver, among others.

The memory 214 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 214 may incorporate electronic, magnetic, optical, and/or other types of storage media. Note that the memory 214 can have a distributed architecture, where various components are situated remote from one another, but can be accessed by the control module 270.

The software in memory 214 may include one or more separate programs, each of which comprises an ordered listing of executable instructions for implementing logical functions. In the example of FIG. 2, the software in the memory 214 includes a suitable operating system (O/S) 222, dithering unit logic 252, differentiation logic 254, and channel assignment logic 256, the logics 252, 254, 256 of which facilitate managing access channels between base stations 145, 150, 155 and mobile stations 103. Operations of the dithering unit logic 252, differentiation logic 254, and channel assignment logic 256 can be described in detail in relation to FIGS. 3 and 4.

When the base station 145, 150, 155 is in operation, the control module 270 is configured to execute software stored within the memory 214, to communicate data to and from the memory 214, and to generally control operations of the base station 145, 150, 155 pursuant to the software. The dithering unit logic 252, the differentiation logic 254, the channel assignment logic 256 and the O/S 22, in whole or in part, but typically the latter, are read by the control module 270, perhaps buffered within the control module 270, and then executed.

When the dithering unit logic 252, the differentiation logic 254, and the channel assignment logic 256 are implemented in software, as is shown in FIG. 2, it should be noted that the dithering unit logic 252, the differentiation logic 254, and the channel assignment logic 256 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the dithering unit logic 252, the differentiation logic 254, and the channel assignment logic 256 are implemented in hardware, the dithering unit logic 252, the differentiation logic 254, and the channel assignment logic 256 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A nonexhaustive list of examples of suitable commercially available operating systems 222 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 222 essentially controls the execution of other computer programs, such as the refresh manager 110, and provides scheduling, input-output control, file and data management, memory management, and communication control and related services.

If the base station 145, 150, 155 is a PC, workstation, or the like, the software in the memory 214 may further include a basic input output system (BIOS) (omitted for simplicity). The BIOS is a set of essential software routines that initialize and test hardware at startup, start the O/S 222, and support the transfer of data among the hardware devices. The BIOS is stored in ROM so that the BIOS can be executed when the base station 145, 150, 155 is activated.

Figure 3:
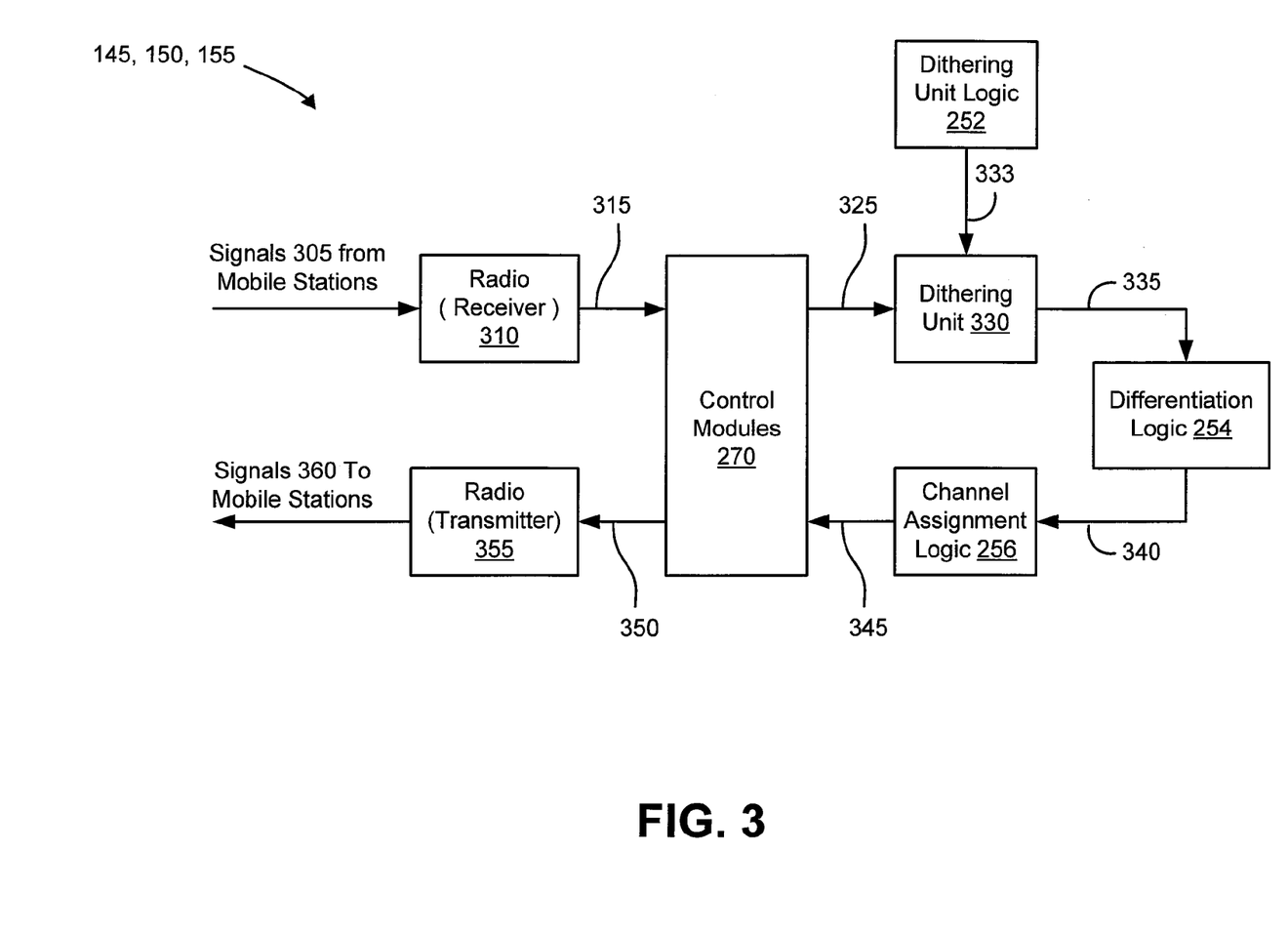
FIG. 3 is a data flow diagram that illustrates an embodiment of the architecture, functionality, and/or operation of the base stations, such as that shown in FIG. 2, that can manage access channels.

FIG. 3 is a data flow diagram that illustrates an embodiment of the architecture, functionality, and/or operation of the base stations, such as that shown in FIG. 2, that can manage access channels. A radio receiver 310 of the wireless radio module 220 (FIG. 2) receives signals 305 from mobile stations 103 and detects the data rate of the transmitted signals 305 associated with the respective mobile stations 103. The radio receiver 310 transmits the data rate signal via line 315 to a control module 270 which sends the data rate signal via line 325 to a dithering unit 330. The dithering unit logic 252 (FIG. 2) sends instructions to the dithering unit 330 via line 333, which applies the dithering noise to the data rate signal based on the instructions. The dithering unit 330 sends the dithered signals to the differential logic 254, which quantizes the noise on the dithered signal.

The differential logic 254 sends the quantized signal via line 340 to the channel assignment logic 256, which is configured to determine the quantization levels and assign access channels between the base station 145, 150, 155 and the mobile stations 103 based on the determined quantization levels. It should be noted that the access channels include different data rates that are associated with the transfer rate of data being communicated between the base stations 145, 150, 155 and the mobile stations 103.

The control module 270 receives via line 345 the information associated with assigning the access channels to the mobile stations and stores the information in the memory 214 (FIG. 2). The control module 270 instructs a transmitter 355 of the wireless radio module 220 via line 350 to transmit the information from the channel assignment logic 256, the information being associated with assigning the access channels to the mobile stations.

Figure 4:
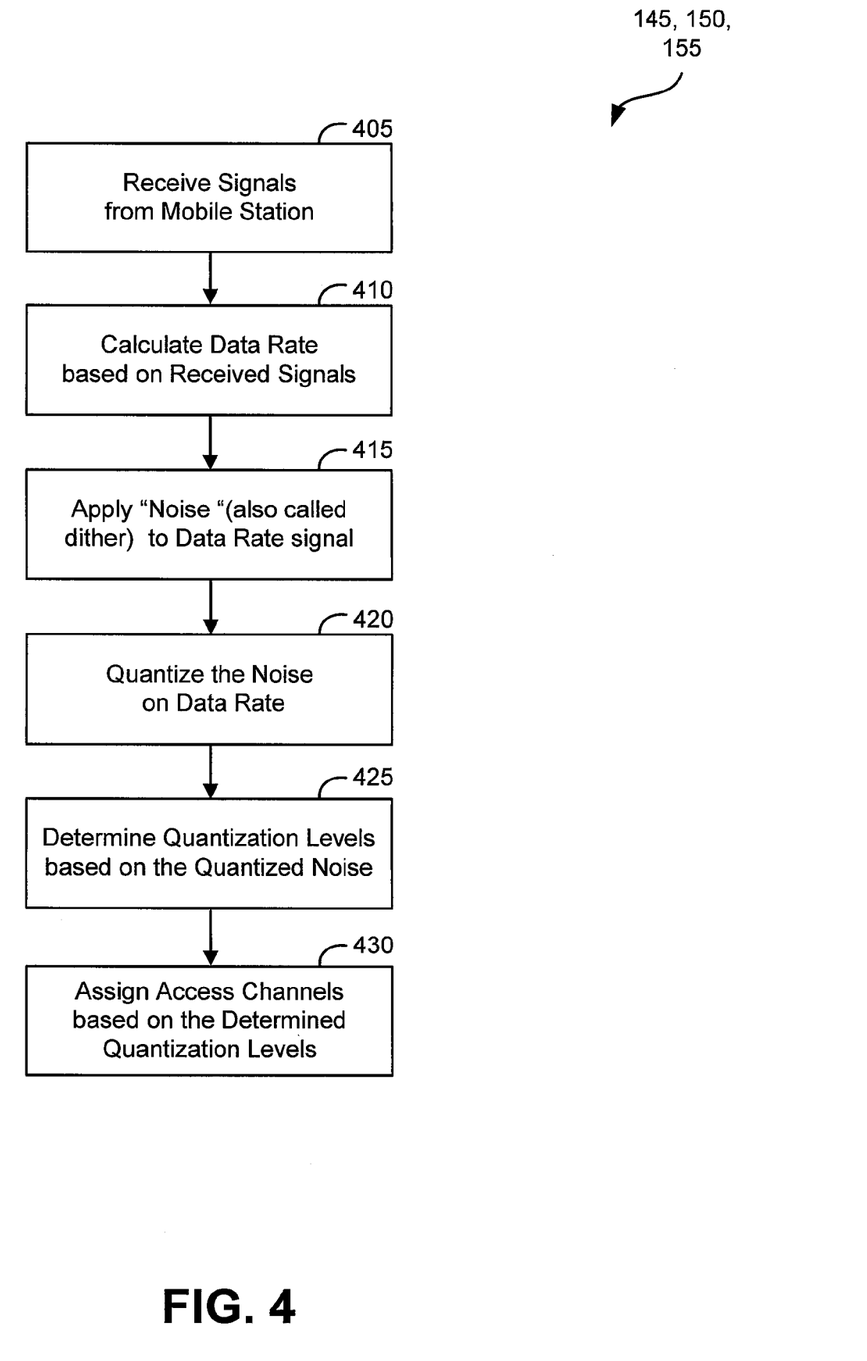
FIG. 4 is a flow diagram that illustrates an embodiment of the architecture, functionality, and/or operation of the base stations, such as that shown in FIG. 2.

FIG. 4 is a flow diagram that illustrates an embodiment of the architecture, functionality, and/or operation of the base stations 145, 150, 155, such as that shown in FIG. 2. Beginning with step 405, the base station 145, 150, 155 (FIG. 1) receives RF signals from mobile station 103. In step 410, the radio receiver 310 (FIG. 3) of the base station 145, 150, 155 calculates the data rate of the received signals. In step 415, the dithering unit 252 applies noise (also called dithering) to the data rate signal. In step 420, the differentiation logic 254 quantizes the noise on the data rate signal, forming quantization levels. In steps 425 and 430, the channel assignment logic 256 determines the quantization levels based on the quantized noise on the data rate signal and assigns the access channels to the mobile stations 103 based on the determined quantization levels, respectively.

Figure 5:
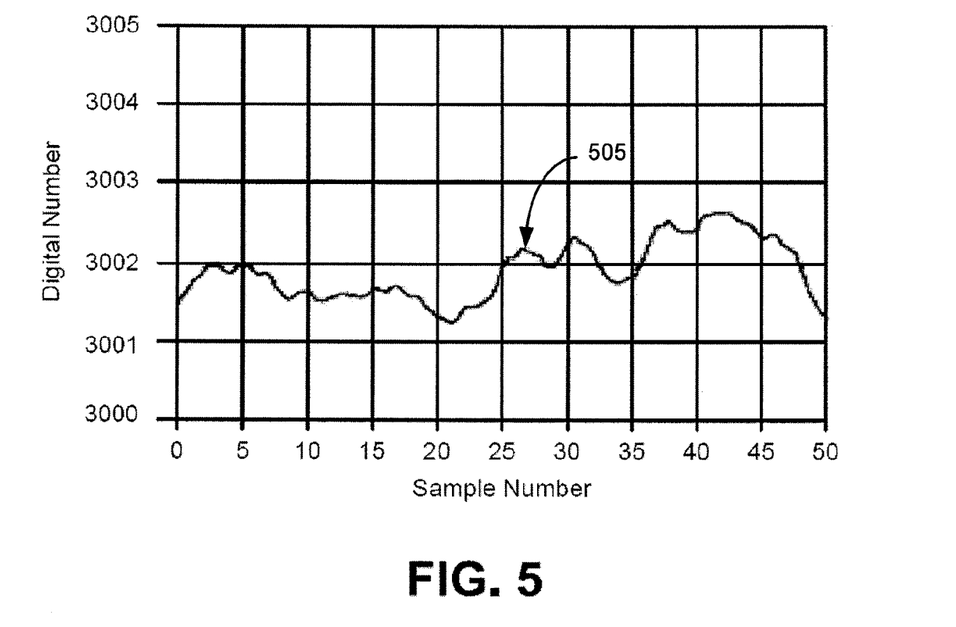
FIG. 5 is a graphical diagram that illustrates a scenario where signals were sampled in the network infrastructure, such as that shown in FIG. 1, to determine the data rates associated with respective mobile stations.

FIG. 5 is a graphical diagram that illustrates a scenario where signals were sampled in the network infrastructure 100, such as that shown in FIG. 1, to determine the data rates associated with respective mobile stations 103. The radio receiver 310 (FIG. 3) receives RF signals from the mobile stations 103 (FIG. 1) and detects the data rate of the RF signals. In this example, the data rate signal 505 is gathered from 50 sampled mobile stations 103 in which the sampled data rates are calculated between 3001 bits per section (bps) to 3003 bps. It could be seen from FIG. 5, most of the samples are generally located at 3002 bps and few samples are located at 3001 bps or 3003 bps. But the actual (analog/continues) data rate waveform (not shown) is not so discrete.

Figure 6:
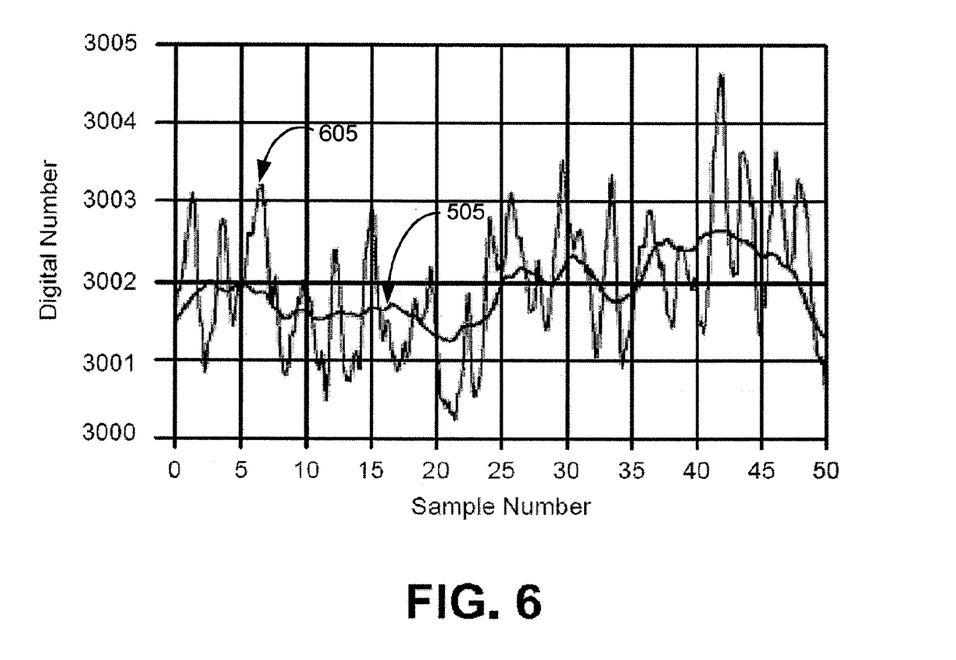
FIG. 6 is a graphical diagram that illustrates a scenario where dithering noise was applied to the sampled signals, such as that shown in FIG. 5.

FIG. 6 is a graphical diagram that illustrates a scenario where dithering noise was applied to the sampled signals, such as that shown in FIG. 5. The dithering unit 330 (FIG. 3) applies the data rate signal 505 with dithering noise 605, which ranged between 3000 bps to 3005 bps. The dithering noise 605 expanded the range of the data rate signal to include two more levels, e.g., 3000 bps and 3004 bps. Now compared to FIG. 5, the data rate signal 505 having the dithering noise 605 is more differentiated and represented well.

Figure 7:
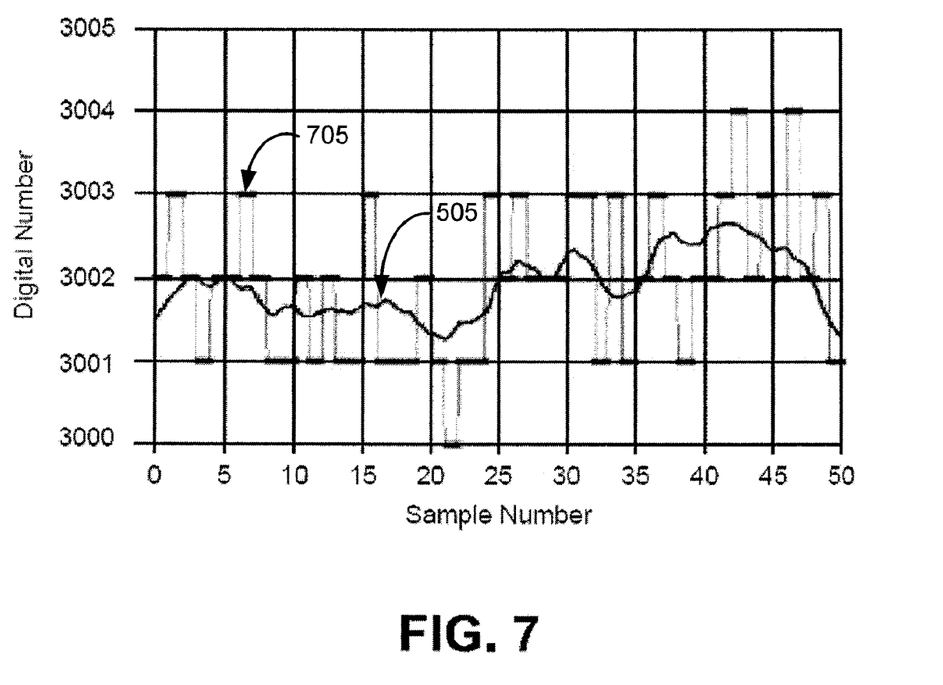
FIG. 7 is a graphical diagram that illustrates a scenario where dithered signals, such as that shown in FIG. 6, was quantized.

FIG. 7 is a graphical diagram that illustrates a scenario where the dithered signal 605, such as that shown in FIG. 6, was quantized. The differential logic 254 (FIG. 2) quantizes the dithered signal 605 such that the data rate signal 505 can be associated with five (5) priority categories in this new scenario, e.g., between 3000 bps and 3004 bps. It should be noted that without the dithered signal 605, the data rate signal 505 can be associated with three (3) priority categories, e.g., between 3001 bps and 3003, instead of five categories.

As indicated in FIG. 7, the sampled mobile station 21 is quantized at 3000 bps; the sampled mobile stations 3, 8, 9, 11, 13, 14, 16-18, 20, 22, 23, 32, 34, 38, and 49 are quantized at 3001 bps; the sampled mobile stations 0, 2, 4, 5, 7, 10, 12, 19, 25, 27-29, 35, 37, 39, 40, 43, 45, and 47 are quantized at 3002 bps; the sampled mobile stations 1, 6, 15, 24, 26, 30, 31, 33, 36, 41, 44, and 48 are quantized at 3003 bps; and the sampled mobile stations 42 and 46 are quantized at 3004 bps. Accordingly, the channel assignment logic 256 (FIG. 2) determines quantization levels based on the quantized signals and classifies the access channels into the five (5) priority categories that are associated with the five quantization levels. Such priority categories include different levels of priorities with respect to accessing a network and different data rates.

In this example, the channel assignment logic 256 can assign the sampled mobile station 21 with the lowest priority of access and slowest data transfer rate, meaning that the mobile station 21 receives the lowest priority of accessing the access channels as well as the slowest speed of data transfer rate. However, the channel assignment logic 256 can assign the sampled mobile stations 42 and 46 with the highest priority of accessing the channels as well as the fastest data transfer rate.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A system for managing access channels comprising:
   a base station that is configured to receive transmitted signals from one or more mobile stations, calculate one or more data rates based on the transmitted signal associated with the one or more mobile stations, respectively, and generate data rate signals based on the calculated one or more data rates, the base station including:
      a dithering unit that is configured to apply dithering noise to the data rate signals, and
      memory that includes channel assignment logic configured to assign access channels to the one or more mobile stations based on the dithered signals, respectively.

2. The system as defined in claim 1, further comprising a wireless radio module that is configured to receive the transmitted signals, calculate the one or more data rates based on the transmitted signals, generate the data rate signals, receive data associated with the assigned access channels, and transmit the data associated with the assigned access channels to the one or more mobile stations.

3. The system as defined in claim 1, wherein the memory further includes dithering unit logic that is configured to instruct the dithering unit to apply dithering noise to the generated data rate signals.

4. The system as defined in claim 1, wherein the memory further includes differentiation logic that is configured to quantize the dithered signals.

5. The system as defined in claim 4, wherein the access channels include different data rates that are associated with the transfer rate of data being communicated between the one or more mobile stations and the base station, the channel assignment logic being further configured to classify the access channels into priority categories, the priority categories having different levels of priorities with respect to accessing a network and different data rates.

6. The system as defined in claim 5, wherein the channel assignment logic is configured to:
   determine quantization levels based on the quantized signals, and
   associate the quantization levels with the respective priority categories.

7. The system as defined in claim 1, wherein the base station further includes a transmitter configured to transmit signals that include information associated with assigning the access channels to the one or more mobile stations based on the dithered signals, respectively.

8. The system as defined in claim 1, wherein the base station further includes a receiver that receives the transmitted signals from the respective mobile stations.

9. The system of claim 1, wherein said data rate is measured in bits per second and said data rate signal indicates how said data rate varies between different mobile stations.

10. A method for managing access channels, the method comprising:
    receiving transmitted signals from one or more mobile stations;
    calculating one or more data rates based on the transmitted signal associated with the one or more mobile stations, respectively;
    generating data rate signals based on the calculated one or more data rates;
    applying dithering noise to the data rate signals; and
    assigning access channels to the one or more mobile stations based on the dithered signals, respectively.

11. The method as defined in claim 10, further comprising quantizing the dithered signals.

12. The method as defined in claim 10, further comprising classifying the access channels into priority categories, the priority categories having different levels of priorities with respect to accessing a network and different data rates with respect to the transfer rate of data being communicated between the one or more mobile stations and the base station.

13. The method as defined in claim 10, further comprising transmitting signals that include information associated with assigning the access channels to the one or more mobile stations based on the dithered signals, respectively.

14. A base station comprising:
    a wireless radio module that is configured to receive transmitted signals from one or more mobile stations, calculate one or more data rates based on the transmitted signals, and generate data rate signals based on the calculated one or more data rates;
    a dithering unit that is configured to apply dithering noise to the data rate signals; and
    memory that includes channel assignment logic configured to assign access channels to the one or more mobile stations based on the dithered signals, respectively.

15. The base station as defined in claim 14, wherein the memory further includes dithering unit logic that is configured to instruct the dithering unit to apply dithering noise to the generated data rate signals.

16. The base station as defined in claim 14, wherein the memory further includes differentiation logic that is configured to quantize the dithered signals.

17. The base station as defined in claim 16, wherein the access channels include different data rates that are associated with the transfer rate of data being communicated between the one or more mobile stations and the base station, the channel assignment logic being further configured to classify the access channels into priority categories, the priority categories having different levels of priorities with respect to accessing a network and different data rates.

18. The base station as defined in claim 17, wherein the channel assignment logic is configured to:

determine quantization levels based on the quantized signals, and associate the quantization levels with the respective priority categories.

19. The base station as defined in claim 14, further comprising a transmitter configured to transmit signals that include information associated with assigning the access channels to the one or more mobile stations based on the dithered signals, respectively.

20. The base station of claim 14, wherein said data rate is measured in bits per second and said data rate signal indicates how said data rate varies between different mobile stations.

* * * * *